United States Patent
Averboch et al.

(10) Patent No.: US 10,440,003 B2
(45) Date of Patent: Oct. 8, 2019

(54) AUTOMATIC ON DEMAND RE-AUTHENTICATION OF SOFTWARE AGENTS

(71) Applicant: Kasisto, Inc., New York, NY (US)

(72) Inventors: Guillermo Averboch, New York, NY (US); Sasha Caskey, New York, NY (US); Yi Ma, New York, NY (US); Sathish Pammi, East Newark, NJ (US); Robert Stewart, Huntington, NY (US)

(73) Assignee: KASISTO, INC., New York, NY (US)

( * ) Notice: Subject to any disclaimer, the term of this patent is extended or adjusted under 35 U.S.C. 154(b) by 234 days.

(21) Appl. No.: 15/265,306

(22) Filed: Sep. 14, 2016

(65) Prior Publication Data

US 2018/0077131 A1 Mar. 15, 2018

(51) Int. Cl.
| | | |
|---|---|---|
| *H04L 29/06* | (2006.01) | |
| *H04L 9/32* | (2006.01) | |
| *G06F 17/28* | (2006.01) | |
| *G06F 17/27* | (2006.01) | |
| *G06F 21/44* | (2013.01) | |

(52) U.S. Cl.
CPC ............ *H04L 63/08* (2013.01); *G06F 17/271* (2013.01); *G06F 17/2785* (2013.01); *G06F 21/44* (2013.01); *H04L 9/3215* (2013.01); *H04L 63/0861* (2013.01); *H04L 63/0884* (2013.01)

(58) Field of Classification Search
CPC ... H04L 63/08; H04L 63/0884; G06F 17/271; G06F 17/2785
See application file for complete search history.

(56) References Cited

U.S. PATENT DOCUMENTS

| 7,194,069 | B1 * | 3/2007 | Jones | H04M 3/493 379/210.01 |
| 7,231,661 | B1 * | 6/2007 | Villavicencio | G06F 21/41 709/225 |
| 7,475,240 | B2 | 1/2009 | Shah et al. | |
| 7,962,326 | B2 * | 6/2011 | Tsourikov | G06F 17/2785 704/9 |
| 8,560,712 | B2 * | 10/2013 | Hockings | G06F 21/31 709/229 |
| 8,763,097 | B2 * | 6/2014 | Bhatnagar | G06F 21/35 726/5 |
| 9,356,963 | B2 * | 5/2016 | Hockings | G06F 21/31 |
| 9,819,582 | B2 * | 11/2017 | Ellis | H04L 63/0815 |
| 10,231,122 | B2 * | 3/2019 | Childress | G06F 21/31 |
| 10,250,580 | B2 * | 4/2019 | Bailey | H04L 9/3215 |

(Continued)

FOREIGN PATENT DOCUMENTS

WO 2005119653 A1 12/2005

*Primary Examiner* — Linglan E Edwards

(74) *Attorney, Agent, or Firm* — Ryan, Mason & Lewis, LLP

(57) ABSTRACT

A system for re-authentication comprises a re-authentication server, implemented by one or more processing devices. The re-authentication server is configured to receive a re-authentication request from an organizational server, process the re-authentication request, and transmit a re-authentication prompt to a user device, wherein the re-authentication request is transmitted from the organizational server to the re-authentication server without being communicated to an application server configured to receive a request for at least one of a service and data from the user device.

19 Claims, 5 Drawing Sheets

(56) References Cited

U.S. PATENT DOCUMENTS

| | | | |
|---|---|---|---|
| 2003/0134615 A1* | 7/2003 | Takeuchi | G06Q 20/02 |
| | | | 455/411 |
| 2008/0208580 A1 | 8/2008 | Scholl | |
| 2011/0054905 A1* | 3/2011 | Lagadec | G10L 13/047 |
| | | | 704/270 |
| 2016/0358152 A1* | 12/2016 | Boukadakis | G10L 15/00 |
| 2017/0012965 A1* | 1/2017 | Hurst | H04L 63/0892 |
| 2017/0068550 A1* | 3/2017 | Zeitlin | G06F 9/4843 |

* cited by examiner

AUTOMATIC ON DEMAND RE-AUTHENTICATION OF SOFTWARE AGENTS

TECHNICAL FIELD

The field generally relates to re-authentication and, in particular, to using an independent re-authentication server to process the on-demand re-authentication.

BACKGROUND

In general, authentication is used by a server to verify the identity of entities or individuals accessing the server and the information thereon. In an authentication scenario, machines and/or users can prove their identities to a server with, for example, user names, passwords, voice recognition, or other biometric tools. Once a client is authenticated by a server, the server can provide certain authorizations to the client, outlining which resources a client can use, and/or which files a client can access. Authorization can be based on the identity of the client, and what privileges that client may have been given.

During conversations with secure software agents, clients are typically authenticated at the beginning of the conversation, and often need to be re-authenticated as a conversation with a software agent progresses. Depending on, for example, the requirements of the server and/or the security of the information being accessed, such re-authentication may occur multiple times during the course of a conversation with a software agent. This type of secondary, on-demand, re-authentication may rely on one-time credentials, such as, for example, one-time passcodes (OTPs), or other hardware and software authentication tokens, which are generally valid only in the context of an existing, and previously authenticated, session, and only for one re-authentication attempt.

For example, banking transactions, such as obtaining balances, or transferring money between accounts, are generally subject to this kind of enhanced authentication.

SUMMARY

According to an exemplary embodiment of the present invention, a method for re-authentication comprises establishing an interactive session between a user and an organizational server, receiving a natural language request for at least one of a service and data from a user device via a conversational component of a first server, processing the natural language request by the first server, and transmitting a non-natural language request for at least one of the service and the data to the organizational server, receiving the non-natural language request for at least one of the service and the data at the organizational server, and determining by the organizational server that the non-natural language request requires re-authentication of the user, transmitting a re-authentication request from the organizational server to a second server, processing the re-authentication request by the second server and transmitting a re-authentication prompt from the second server to the user device, wherein the re-authentication request from the organizational server to the second server is transmitted to the second server without being communicated to the first server.

According to an exemplary embodiment of the present invention, a system for re-authentication, comprises one or more processing devices operatively connected via a communications network, an organizational server, implemented by the one or more processing devices, wherein the organizational server is configured to establish an interactive session with a user, and a first server, implemented by the one or more processing devices. The first server is configured to receive a natural language request for at least one of a service and data from a user device, process the natural language request, and transmit a non-natural language request for at least one of the service and the data to the organizational server. The first server includes a conversational component. The organizational server is further configured to receive the non-natural language request for at least one of the service and the data, and determine that the non-natural language request requires re-authentication of the user. A second server, implemented by the one or more processing devices, is configured to receive a re-authentication request from the organizational server, process the re-authentication request, and transmit a re-authentication prompt to the user device, wherein the re-authentication request is transmitted from the organizational server to the second server without being communicated to the first server.

According to an exemplary embodiment of the present invention, an article of manufacture comprises a processor-readable storage medium having encoded therein executable code of one or more software programs, wherein the one or more software programs when executed by one or more processing devices implement the steps of establishing an interactive session between a user and an organizational server; receiving a natural language request for at least one of a service and data from a user device via a conversational component of a first server, processing the natural language request by the first server, and transmitting a non-natural language request for at least one of the service and the data to the organizational server, receiving the non-natural language request for at least one of the service and the data at the organizational server, and determining by the organizational server that the non-natural language request requires re-authentication of the user, transmitting a re-authentication request from the organizational server to a second server, processing the re-authentication request by the second server and transmitting a re-authentication prompt from the second server to the user device. The re-authentication request from the organizational server to the second server is transmitted to the second server without being communicated to the first server.

According to an exemplary embodiment of the present invention, a system for re-authentication comprises a re-authentication server, implemented by one or more processing devices. The re-authentication server is configured to receive a re-authentication request from an organizational server, process the re-authentication request, and transmit a re-authentication prompt to a user device, wherein the re-authentication request is transmitted from the organizational server to the re-authentication server without being communicated to an application server configured to receive a request for at least one of a service and data from the user device.

According to an exemplary embodiment of the present invention, a method for re-authentication, comprises receiving, from a first server, a non-natural language request for at least one of a service and data at an organizational server, determining by the organizational server that the non-natural language request requires re-authentication of a user, and transmitting a re-authentication request from the organizational server to a second server, wherein the second server processes the re-authentication request and transmits a re-authentication prompt from the second server to a user device, and wherein the re-authentication request from the organizational server to the second server is transmitted to the second server without being communicated to the first server.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION

Figure 1:
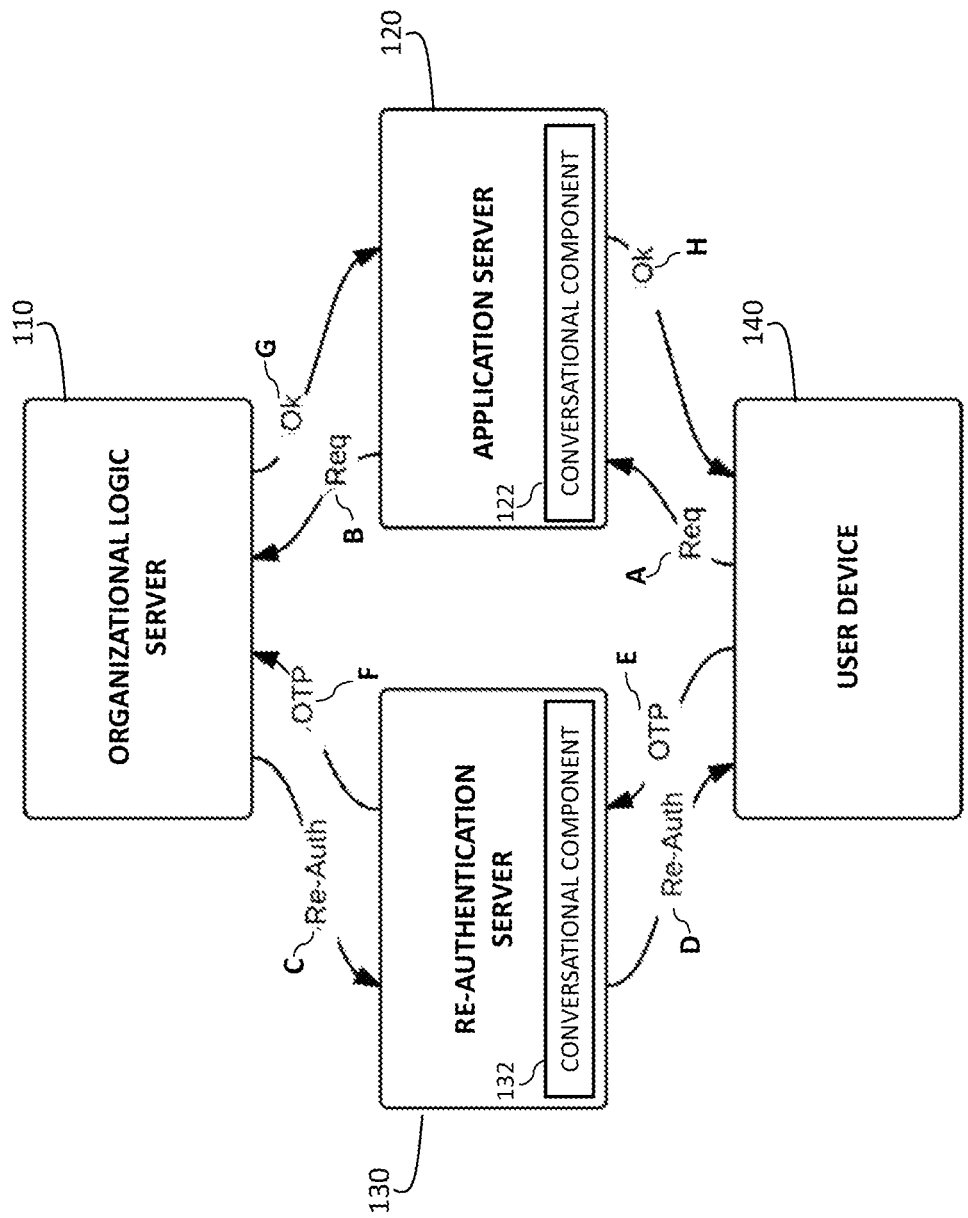
FIG. 1 is a block diagram of a system for re-authentication, according to an exemplary embodiment of the present invention.

Exemplary embodiments of the invention will now be discussed in further detail with regard to re-authentication and, in particular, to using an independent re-authentication server to process the on-demand re-authentication. This invention may, however, be embodied in many different forms and should not be construed as limited to the embodiments set forth herein.

As used herein, a network, can refer to, but is not necessarily limited to, a local area network (LAN), wide area network (WAN), cellular network, satellite network or the Internet. Network communication can be performed via one or more centralized servers or cloud data centers that receive, analyze and send data to and from one or more client devices, such as, for example, smart phones, tablets or other computing devices, that, by way of example, are part of the network.

In accordance with an embodiment of the present invention, re-authentication as a conversation with a software agent progresses is performed in the realm of conversational, natural language based systems. Embodiments of the present invention provide a dedicated re-authentication component, which is separate from an entity's conversational system. In this way, the entity's conversational system can focus on processing and responding to requests for services and information for a client during a session, without needing to pose re-authentication queries to a user as may be required by the underlying system. For example, a re-authentication server according to an embodiment of the present invention, handles provision of re-authentication queries and end user responses to the re-authentication queries, while freeing a primary natural language based conversational system to handle substantive requests (e.g., in the context of a banking application, requests for banking services). As a result, the complexity of a primary conversational system can be exponentially decreased, making it less error prone and fragile.

Embodiments of the present invention free a primary conversational natural language based system from the complexities of secondary, on-demand, re-authentication so that conversational artificial intelligence (AI) agents can be developed, which are able to interface with users and organizations independent of re-authentication rules and requirements. Accordingly, an application server, in accordance with an embodiment of the present invention, can focus on the substantive requirements of the conversational AI agents in providing users with appropriate responses to requests for information and services without needing to address re-authentication. Conventional conversational systems, however, must be programmed to handle and react to any re-authentication requirement, including on-demand re-authentication requirements, originated in an organizational logic component, as well as handle and react to substantive requests for services and information.

In accordance with an embodiment of the present invention, instead of a primary conversational system, an independent re-authentication server receives and applies re-authentication requests, and receives and applies changes in re-authentication rules, including, for example, which transactions must be re-authenticated, and how a re-authentication is implemented. For example, different entities may have different re-authentication requirements. A dedicated re-authentication server, according to an embodiment of the present invention, can effectively communicate with organizational logic servers of multiple entities (e.g., different financial institutions) and handle and process different re-authentication protocols of the respective entities. For example, a re-authentication server, in accordance with an embodiment of the present invention, can interface between multiple end users and multiple organizations with different re-authentication protocols. According to an embodiment, the re-authentication server may operate in the same conversational style as a primary conversational system, and therefore, may include its own distinct conversational component (e.g., secondary conversational system); so that a user can converse with the re-authentication server without recognizing that the re-authentication server is separate from the primary conversational system.

In accordance with an embodiment of the present invention, an application server is a primary conversational server, which includes a conversational (or dialogue) manager (also referred to herein as a conversational component) to converse in natural language with a user about different intents. For example, getting available balances from bank accounts, and obtaining information about near-by bank branches and automated teller machines (ATMs) are user intents.

According to an embodiment of the present invention, a re-authentication server is a secondary conversational server, which includes a conversational (or dialogue) manager for handling authentication/authorization. For example, the re-authentication server can ask questions in natural language prompts, and can accept authentication information in a conversational style.

A scenario when a re-authentication server activates may be as follows:

Re-authentication Server: "Sorry to interrupt your conversation, but security is my primary concern. Can you please provide your OTP?"

User: "That's okay, my OTP is 111111."

In such scenario, a user would not notice switching between the application server and the re-authentication server.

A conversational style of a conversational system is based on the target audience of the systems, and, as noted above, can be the same between the application server and the re-authentication server so that a user can converse with the re-authentication server without recognizing that the re-authentication server is separate from the primary conversational system. For example, a conversational style includes language used, such as English or Spanish, or local variants of languages, such as, for example, American English, or Mexican Spanish, and can correspond to the country and/or region where the system will be deployed. Additionally, conversational styles may specify different degrees of formality in the language used, based, for example, on the country and/or region where the system will be deployed, and on the demographics of the expected users. For example, a banking system meant for retirees to make withdrawals from their retirement accounts may use a more formal language than a banking system for making digital payments to friends, which may be targeted to a younger audience than the retirees. A system implementing a formal conversational style may be programmed to use certain terms, such as, "please," more often, and may be programmed to use longer and more verbose sentences and questions than a system implementing a less formal conversational style. The system implementing a less formal conversational style may be programmed to not use the word "please" as often, and to use more succinct and to-the-point questions and answers than the system implementing the formal conversational style.

According to an embodiment of the present invention, all questions and answers to be presented to users by the re-authentication server could be configured to use a language identical, or at least substantially similar, to the language of the primary conversational system. In a non-limiting illustrative embodiment, keys would be associated with each of the questions and answers that a system could present to users, and a user could, or the system could automatically configure each of the keys to any desired sentences, in any language, and using a selected or predetermined degree of language formalism. For example, a key for a first response to an incorrectly submitted one-time password could be programmed. For a formal system, the key could be set to a message such as "I am sorry. That one time password did not match my records. Would you mind entering it again?", and for an informal system, the key could be set to a message such as "The OTP is not recognized. Enter the OTP again."

While embodiments of the present invention are discussed in the context of the re-authentication server having a conversational component, the embodiments of the present invention are not necessarily limited thereto, and may also include re-authentication servers that do not necessarily use language processing.

An "organizational-logic component" or "organizational logic server" as used herein can refer to software and/or hardware implementing a conversational system in an application server to respond to specific requests for services and/or information made by a client, and implementing another conversational system in a re-authentication server to re-authenticate an end-user before responding to the requests for services and/or information. For example, in a banking scenario, the organizational logic component would be a bank computer system needing to re-authenticate end users before responding to specific requests for financial services and/or information from clients.

As used herein, "on-demand" or "on-demand re-authentication" can refer to a request for re-authentication occurring during an authenticated session requiring a response to a re-authentication request in order for the session to continue and/or for certain types of information or services to be released. On-demand re-authentication can include the dynamic provision of an authentication token, such as for example, a one-time passcode (OTP) (described further below), to an end user in real-time, which must be provided to organizational logic server in order for the re-authentication to succeed. As used herein, the term "real-time" can refer to output within strict time constraints. Real-time output can be understood to be instantaneous or on the order of milliseconds or microseconds. Of course, it should be understood that depending on the particular temporal nature of the system in which an embodiment of the invention is implemented, other appropriate timescales that provide at least contemporaneous performance and output can be achieved.

As used herein, "natural language processing (NLP)" can refer to interactions between computers and human (natural) languages, where computers are able to derive meaning from human or natural language input, and respond to requests and/or commands provided by a human using natural language.

As used herein, "natural language understanding (NLU)" can refer to a sub-category of natural language processing in artificial intelligence (AI) where natural language input is disassembled and parsed to determine appropriate syntactic and semantic schemes in order to comprehend and use languages. NLU may rely on computational models that draw from linguistics to understand how language works, and comprehend what is being said by a user.

As used herein, "non-natural language", "non-natural language request" or "non-natural language command" can refer to an application programming interface (API) call to an organizational server for retrieving user-specific/personalized data, such as, but not necessarily limited to, account balance and/or transaction information from a bank or organization, or other data. These API calls may require "on demand" re-authentication for security purposes, and are not in natural language.

In accordance with an embodiment of the present invention, the conversational system of an application server is not concerned with, and may not be aware of any re-authentication requirements. According to embodiments of the present invention, an organizational logic component channels all re-authentication requests through a re-authentication server, which is responsible for eliciting the necessary re-authentication credentials from an end user, and for verifying the re-authentication credentials against the organizational logic component. Once this process is successfully finalized, the organizational logic component responds to the original request made through the conversational system of the application server. The application server conversational system can be completely unaware that a re-authentication information exchange has taken place. Furthermore, in accordance with embodiments of the present invention, an interface for end users is seamless, so that from their perspective, the end users do not notice that they have been interacting with two different systems (e.g., conversational systems of application and re-authentication servers). From the users' perspectives, it is the same system handling re-authentication requirements and responding to organizational requests.

While not necessarily limited thereto, embodiments of the present invention correspond to on-demand re-authentication during an already established session, which generally does not require encryption, since the re-authentication credentials are only valid in the context of an existing, and previously authenticated session, and are generally only valid for one re-authentication attempt.

In accordance with an embodiment of the present invention, a re-authentication component or server includes a standalone conversational system that is separate from a primary conversational system of an application server handling substantive requests for information and/or services. The re-authentication component is dedicated to determining when re-authentication is needed, generating prompts for users to understand what they need to provide, and handling the users' responses to the prompts in order to re-authenticate end users if the proper responses are provided or deny re-authentication if the required responses are not received. The re-authentication component can receive and process user responses in the same conversational style as a primary conversational system, providing a user with a seamless experience, whereby any distinction between a re-authentication component and a primary conversational system is not noticeable to the end user. The primary conversational system can be implemented as if re-authentication requirements did not exist, greatly reducing a complexity of the primary conversational system as compared with conventional systems.

Re-authentication requests from an organizational logic component are channeled to end users, and responses to the requests from the end users are channeled to the organizational logic component via the re-authentication component or server, thereby freeing a primary conversational system from any complexities associated with handling these re-authentication requirements. The re-authentication responses may include secondary, and/or one-time re-authentication credentials.

FIG. 1 is a block diagram of a system for re-authentication, according to an exemplary embodiment of the present invention. As shown in FIG. 1 by lines and/or arrows, the components of the system 100 are operatively connected to each other via, for example, physical connections, such as wired and/or direct electrical contact connections, and/or wireless connections, such as, for example, WiFi, BLUETOOTH, IEEE 802.11, and/or networks, including but not limited to, a local area network (LAN), wide area network (WAN), cellular network, ad hoc networks, wireless ad hoc network (WANET), satellite network or the Internet.

By way of non-limiting example, in accordance with an embodiment of the present invention, referring to FIG. 1, a system for re-authentication 100 includes an organizational logic server 110, an application server 120, a re-authentication server 130 and at least one user device 140. While one of each of the organizational logic server 110, application server 120, re-authentication server 130 and user device 140 are shown, the embodiments of the present invention are not necessarily limited thereto, and may include multiple instances of each element. In a non-limiting example, the application server 120 and the re-authentication server 120, 130 may each communicate with multiple organizational logic servers 110 and multiple user devices 140.

The organizational logic server 110 is operatively connected to the application and re-authentication servers 120, 130, and is configured to respond to specific requests for services and/or information made by a user (e.g., client) via a user device 140. The application server 120 sends the requests to the organizational logic server 110, using, for example, an interface provided by the organizational logic server 110. According to an embodiment of the present invention, the organizational logic server 110 is not aware of the conversational functionality of the application server 120. The organizational logic server 110 is further configured to, when required, re-authenticate a user before responding to the requests for services and/or information. According to an embodiment of the present invention, the organizational logic server 110 is configured to send to the re-authentication server 130 re-authentication requests originated in or triggered by requests received from the application server 120. According to an embodiment of the present invention, the organizational logic server 110 is not aware of the user device 140.

The conversational component 132 is configured to operate in the same conversational style as the conversational component 122 of the application server 120, and is able to process a re-authentication prompt to be transmitted in natural language from the re-authentication server 130 to the user device 140. Similarly, the conversational component 132 is configured to receive a natural language re-authentication response from the user device 140 and process the response into non-natural language prior to forwarding the response from the re-authentication server 130 to the organizational server 110.

According to an embodiment, an organizational logic server 110 is a server corresponding to an entity providing, for example, services and information. The entity can include, for example, a financial institution, such as a bank, insurance company, brokerage company or credit union, a medical institution, such as a hospital or physician's office, a governmental organization, an educational institution, or any other entity that may provide information or services to an end user, which requires some level of authentication, re-authentication and authorization. In a non-limiting example, the organizational logic server 110 may be a bank server.

According to an embodiment of the present invention, each of the application server 120 and the re-authentication server 130 has its own interface for communicating with the organizational logic server 110 so that each server 120, 130 independently communicates with the organizational logic server 110. These interfaces can be provided by the organizational logic server 110. Alternatively, the application server 120 and the re-authentication server 130 can be programmed with appropriate interfaces for communicating with the organizational logic server 110.

In accordance with an embodiment of the present invention, the organizational logic server 110 receives non-natural language commands/requests (Req B) from the application server 120 and performs requested operations indicated by those requests (such as, for example, returning an account balance, or transferring funds between accounts) (Ok G and Ok H). The application server 120 and its conversational component 122 are configured to receive natural language commands from a user (Req A) via a user device 140 and perform NLP and NLU steps to convert the natural language commands to the non-natural language commands (Req B) for the organizational logic server 110.

The conversion can be performed by one or more natural language understanding methods and techniques, including, but not necessarily limited to, grammars, regular expressions, machine learning, natural language parsers, which can be grammar based, machine learning based, and/or based on other techniques.

According to an embodiment of the present invention, non-natural language requests to the organizational logic server 110 are provided via an application programming interface (API) exposed by the organizational logic server 110. The API can be a proprietary API supported only for a particular server, or a generic API supported by a server and other servers. For example, for banking requests, one of the function calls may receive as input one or multiple security tokens, an account number, and a feature request (such as "balance"). The re-authentication server 130 also supports a particular API of the organizational logic server 110 through which re-authentication requests would be channeled to the re-authentication server 130.

The application server 120 (e.g., a domain server) is configured to understand natural language commands, and function as a link between a user device 140, such as, for example, a landline telephone, mobile telephone, a smart phone, personal digital assistant (PDA), tablet, desktop or laptop personal computer (PC) running, for example, an application, web page or other interface. The user device is capable of two-way communication with each of the application and re-authentication servers 120, 130.

The organizational logic server 110 may, at any point, not complete a requested transaction, and return a re-authentication request (Re-Auth C) to the re-authentication server 130. The re-authentication server 130 is then responsible for passing the re-authentication request (Re-Auth D) on to the user (e.g., client), receiving the user response (OTP E), and passing on the response (OTP F) to the organizational logic server 110. At that point, the organizational logic server 110 may complete the previously requested transaction (Ok G and Ok H), fail to complete it (if the re-authentication is not correct), or request further re-authentication.

One-time passcode (OTP) authentication tokens may be implemented in hardware and software. For example, a user may read a currently displayed passcode or hear a currently broadcasted passcode and enter or recite the OTP into a computer or other user device 140, which is then transmitted to the re-authentication server 130 as part of an authentication operation in response to a re-authentication request from the re-authentication server 130. Dynamic passcodes, or other software authentication tokens or authenticators, can be implemented in the form of software installed on a user device 140.

According to an embodiment of the present invention, the application server 120 is not aware of any re-authentication requests (e.g., Re-Auth C and Re-Auth D) received in response to any commands (e.g., Req B) sent to the organizational logic server 110. According to an embodiment, the application server 120 sends a command (e.g., Req B) to the organizational logic server 110 based on a request (e.g. Req A) from a user device 140, and receives a response, either success (e.g., Ok G) including the an appropriate response to the request, or failure indicating that the request could not be fulfilled.

The re-authentication server 130, which receives re-authentication requests (e.g., Re-Auth C) from the organizational logic server 110, forwards the re-authentication requests (Re-Auth D) to the user (e.g., client's) device 140 without involving the application server 120. In accordance with an embodiment of the present invention, the re-authentication server 130 is programmed to know what prompts to use for re-authentication requests it sends to a user because the organizational server 110 does not send natural language prompts. The organization logic server 110 may send coded descriptions to the re-authentication server 130 of the reason re-authentication is needed, or of the types of credentials needed from the user. Natural language prompts, and/or translations to various human languages are provided by the re-authentication server 130 to the user via the user device 140. For example, a re-authentication server 130 may be programmed and include in its memory how to prompt users for re-authentication based on which organization is providing the request for re-authentication. By way of non-limiting example, some organizations may require OTPs or other authentication tokens, email addresses, or responses to security questions, and the re-authentication server can know which prompts to apply based on the requesting organization.

According to an embodiment of the present invention, a re-authentication server 130 can support and interact with multiple organizational servers concurrently. A re-authentication server 130 can also be programmed to know how to ask for specific credentials in different human languages based on a language of a user.

In accordance with an embodiment of the present invention, the re-authentication server 130 does not physically reside in the same container as the application server 120. For example, the application and re-authentication servers 120, 130 do not reside in the same web server, and there are distinct ways for the organizational logic server 110 to communicate with each of the two servers 120, 130. Alternatively, the re-authentication server 130 may physically reside in the same container as the application server 120. For example, the application and re-authentication servers 120, 130 may reside in the same web server, but there is a distinct way for the organizational logic server 110 to communicate with each of the two servers 120, 130.

As used herein, a "container" can refer to a machine or hypertext transfer protocol (HTTP) or other web server. In accordance with embodiments of the present invention, the servers 110, 120 and 130 can run on the same machine, and/or on the same web server. Alternatively, the servers 110, 120 and 130 may share the same machine, run on different web servers, or run on different machines, and, hence, on different web servers. There may also not be a need to run the components on web servers. It is to be understood that the servers 110, 120, 130 operate independent from each other, but can be physically organized and communicate in any way that fits a particular organization. As noted herein, according to an embodiment of the present invention, the organizational logic server 110 provides an API, and the application server 120 and re-authentication server 130 use that API to communicate with the organizational logic server 110.

In accordance with an embodiment of the present invention, the client device 140 is capable of accepting asynchronous requests from the re-authentication server 130. For example, a user, via user device 140, may send a request (e.g., Req A) to the application server 120, and the user device 140 may receive an asynchronous re-authentication request (e.g. Re-Auth D) from the re-authentication server 130 before the user device 140 receives a response from the application server 120. Only after the user responds (e.g., OTP E) to the re-authentication request from the re-authentication server 130, the user will receive a response (e.g., Ok H) from the application server 120. Alternatively, the user, via user device 140, may receive additional re-authentication requests from the re-authentication server 130 if the response to a previous re-authentication request failed to result in re-authentication.

Figure 2:
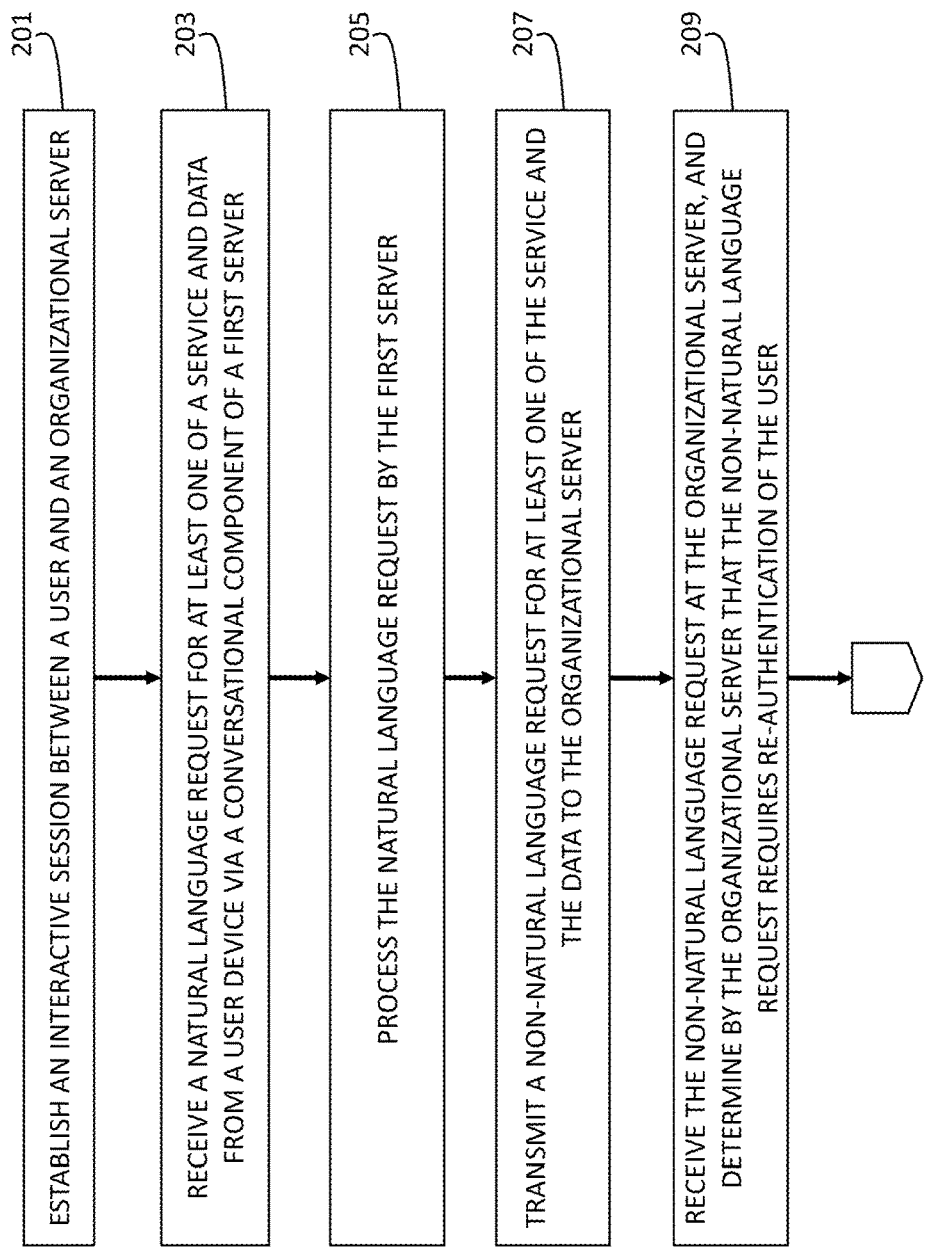
FIG. 2 is a flow diagram of a process for re-authentication, according to an exemplary embodiment of the invention.
Figure 2:
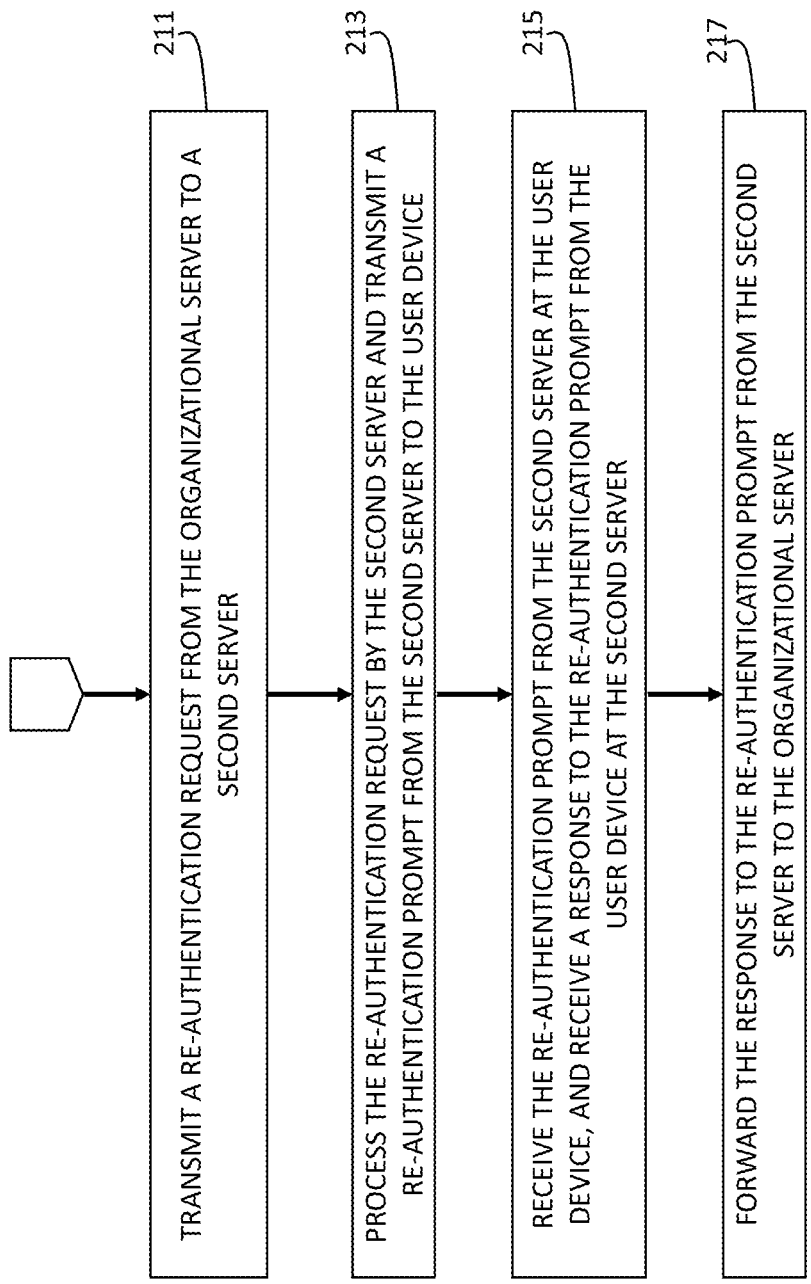

FIG. 2 is a flow diagram of a process for re-authentication, according to an exemplary embodiment of the invention. Referring to FIG. 2, the process 200 includes, at block 201, establishing an interactive session between a user and an organizational server, and at block 203, receiving a natural language request for a service and/or data from a user device via a conversational component of a first server. At block 205, the natural language request is processed by the first server and, at block 207, the non-natural language request for the service and/or the data is transmitted from the first server to the organizational server.

The process 200 also includes receiving the non-natural language request at the organizational server, and determining by the organizational server that the non-natural language request requires re-authentication of the user (block 209). A re-authentication request is then transmitted from the organizational server to a second server (block 211). The re-authentication request is processed by the second server, and a re-authentication prompt is transmitted from the second server to the user device (block 213). The re-authentication request from the organizational server to the second server is transmitted to the second server without being communicated to the first server. The process 200 further includes, at block 215, receiving the re-authentication prompt from the second server at the user device, and receiving a response to the re-authentication prompt from the user device at the second server. The response to the re-authentication prompt is transmitted from the user device to the second server without being communicated to the first server. At block 217, the second server forwards the response to the re-authentication prompt to the organizational server. The first and second servers respectively correspond to the application and re-authentication servers 120 and 130 discussed above. The first server and the second server each communicate with organizational server independent of each other.

The organizational server determines that the response to the re-authentication prompt satisfies a requirement for the re-authentication of the user, and provides a response to the non-natural language request to the first server upon determining that the response to the re-authentication prompt satisfies the requirement for the re-authentication of the user. The response includes the service and/or the data. The first server processes the response to the non-natural language request, and provides the processed response to the user device.

The second server includes a conversational component independent of the conversational component of the first server, wherein the conversational component of the second server is configured to operate in the same conversational style as the conversational component of the first server.

Figure 3:
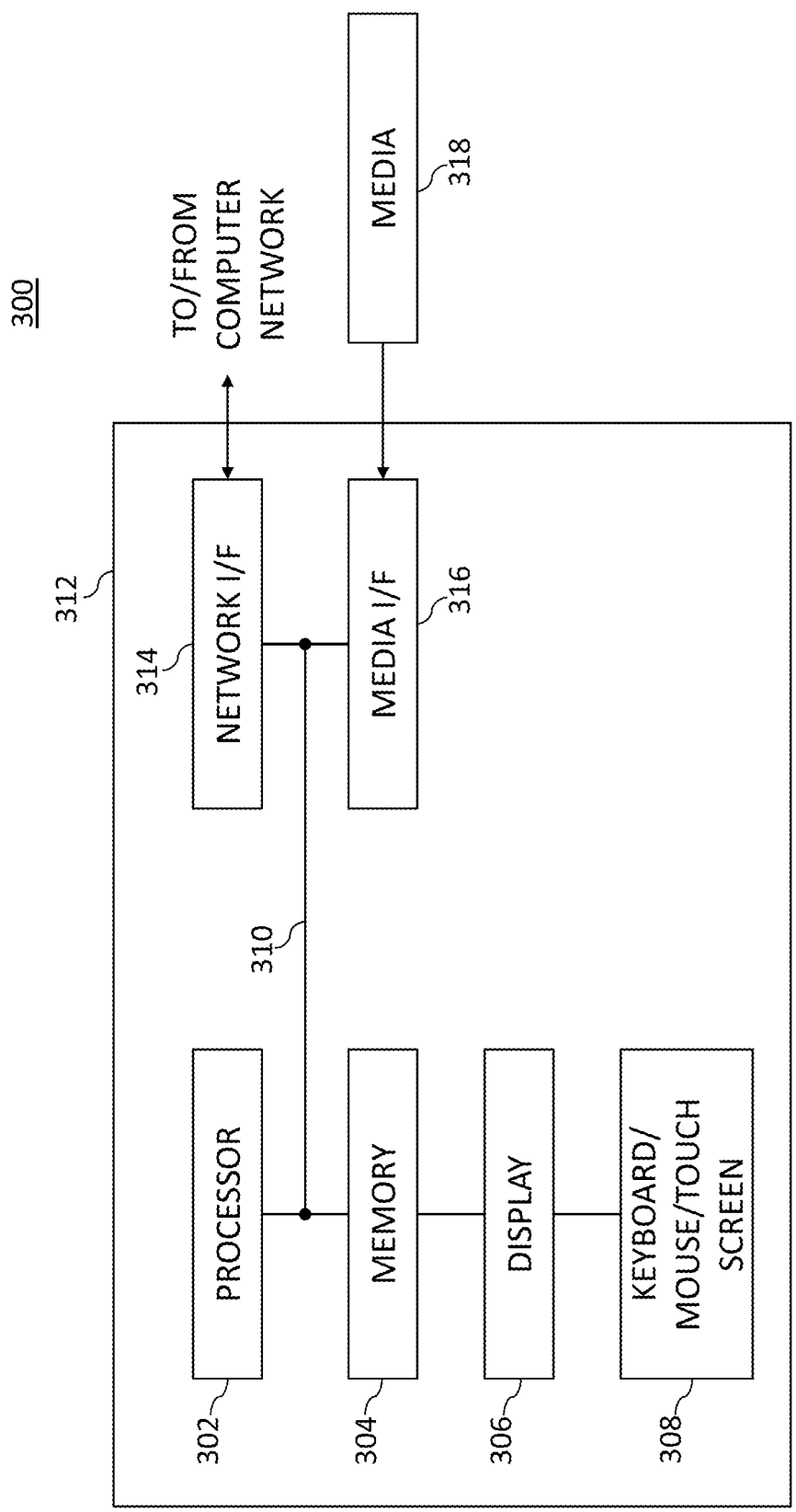
FIG. 3 illustrates a computer system in accordance with which one or more embodiments of the invention can be implemented, according to an exemplary embodiment of the invention.

FIG. 3 illustrates a computer system 300 in accordance with which one or more embodiments of a re-authentication system can be implemented. That is, one, more than one, or all of the components and/or functionalities shown and described in the context of FIGS. 1-2 can be implemented via the computer system depicted in FIG. 3.

By way of illustration, FIG. 3 depicts a processor 302, a memory 304, and an input/output (I/O) interface formed by a display 306 and a keyboard/mouse/touchscreen 308. More or less devices may be part of the I/O interface. The processor 302, memory 304 and I/O interface are interconnected via computer bus 310 as part of a processing unit or system 312 (such as a computer, workstation, server, client device, etc.). Interconnections via computer bus 310 are also provided to a network interface 314 and a media interface 316. Network interface 314 (which can include, for example, transceivers, modems, routers and Ethernet cards) enables the system to couple to other processing systems or devices (such as remote displays or other computing and storage devices) through intervening private or public computer networks (wired and/or wireless). Media interface 316 (which can include, for example, a removable disk drive) interfaces with media 318.

The processor 302 can include, for example, a central processing unit (CPU), a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 302. Memory 304 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 304 may comprise electronic memory such as random access memory (RAM), read-only memory (ROM) or other types of memory, in any combination. The one or more software programs when executed by a processing device such as the processing unit or system 312 causes the device to perform functions associated with one or more of the components/steps of system/methodologies in FIGS. 1-2. One skilled in the art would be readily able to implement such software given the teachings provided herein. Other examples of processor-readable storage media embodying embodiments of the invention may include, for example, optical or magnetic disks.

Still further, the I/O interface formed by devices 306 and 308 is used for inputting data to the processor 302 and for providing initial, intermediate and/or final results associated with the processor 302.

Figure 4:
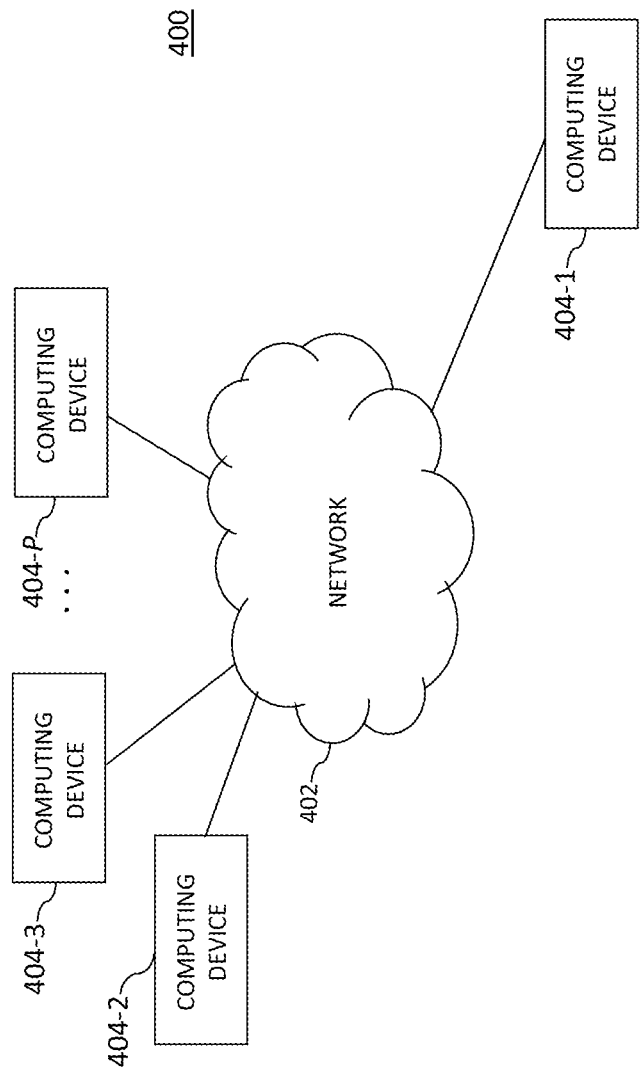
FIG. 4 illustrates a distributed communications/computing network in accordance with which one or more embodiments of the invention can be implemented, according to an exemplary embodiment of the invention.

FIG. 4 illustrates a distributed communications/computing network (processing platform) in accordance with which one or more embodiments of the invention can be implemented. By way of illustration, FIG. 4 depicts a distributed communications/computing network (processing platform) 400 that includes a plurality of computing devices 404-1 through 404-P (herein collectively referred to as computing devices 404) configured to communicate with one another over a network 402.

It is to be appreciated that one, more than one, or all of the computing devices 404 in FIG. 4 may be configured as shown in FIG. 3. It is to be appreciated that the methodologies described herein may be executed in one such computing device 404, or executed in a distributed manner across two or more such computing devices 404. It is to be further appreciated that a server, a client device, a processing device or any other processing platform element may be viewed as an example of what is more generally referred to herein as a "computing device." The network 402 may include, for example, a global computer network such as the Internet, a wide area network (WAN), a local area network (LAN), a satellite network, a telephone or cable network, or various portions or combinations of these and other types of networks (including wired and/or wireless networks).

As described herein, the computing devices 404 may represent a large variety of devices. For example, the computing devices 404 can include a portable device such as a mobile telephone, a smart phone, personal digital assistant (PDA), tablet, computer, a client device, etc. The computing devices 404 may alternatively include a desktop or laptop personal computer (PC), a server, a microcomputer, a workstation, a kiosk, a mainframe computer, or any other information processing device which can implement any or all of the techniques detailed in accordance with one or more embodiments of the invention.

One or more of the computing devices 404 may also be considered a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device, the context of which is apparent from the description.

Additionally, as noted herein, one or more modules, elements or components described in connection with embodiments of the invention can be located geographically-remote from one or more other modules, elements or components. That is, for example, the modules, elements or components shown and described in the context of FIGS. 1-2 can be distributed in an Internet-based environment, a mobile telephony-based environment, a kiosk-based environment and/or a local area network environment. The re-authentication system, as described herein, is not limited to any particular one of these implementation environments. However, depending on the operations being performed by the system, one implementation environment may have some functional and/or physical benefits over another implementation environment.

The processing platform 400 shown in FIG. 4 may comprise additional known components such as batch processing systems, parallel processing systems, physical machines, virtual machines, virtual switches, storage volumes, etc. Again, the particular processing platform shown in this figure is presented by way of example only, and may include additional or alternative processing platforms, as well as numerous distinct processing platforms in any combination. Also, numerous other arrangements of servers, clients, computers, storage devices or other components are possible in processing platform 400.

Furthermore, it is to be appreciated that the processing platform 400 of FIG. 4 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It is to be appreciated that combinations of the different implementation environments are contemplated as being within the scope of embodiments of the invention. One of ordinary skill in the art will realize alternative implementations given the illustrative teachings provided herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. Additionally, the terms "comprises" and/or "comprising," as used herein, specify the presence of stated values, features, steps, operations, modules, elements, and/or components, but do not preclude the presence or addition of another value, feature, step, operation, module, element, component, and/or group thereof.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for re-authentication, comprising:

establishing an interactive session between a user and an organizational server;

receiving a natural language request for at least one of a service and data from a user device via a conversational component of a first server;

processing the natural language request by the first server, and transmitting a non-natural language request for at least one of the service and the data to the organizational server;

receiving the non-natural language request for at least one of the service and the data at the organizational server, and determining by the organizational server that the non-natural language request requires re-authentication of the user;

transmitting a non-natural language re-authentication request from the organizational server to a second server;

processing the non-natural language re-authentication request by the second server and transmitting a natural language re-authentication prompt from the second server to the user device;

wherein the non-natural language re-authentication request from the organizational server to the second server is transmitted to the second server without being communicated to the first server;

wherein the re-authentication is completed without any awareness of the re-authentication by the first server;

wherein the conversational component of the first server is configured to process the natural language request for at least one of the service and the data into the non-natural language request for at least one of the service and the data to be transmitted to the organizational server;

wherein the second server includes a conversational component independent of the conversational component of the first server; and wherein the conversational component of the second server is configured to process the non-natural language re-authentication request into the natural language re-authentication prompt to be transmitted to the user device;

wherein the second server concurrently communicates with and concurrently processes different re-authentication protocols respectively corresponding to the organizational server and one or more additional organizational servers;

wherein the organizational server and the one or more additional organizational servers correspond to different respective entities; and wherein the method is performed by at least one computer system comprising at least one memory and at least one processor connected to the memory.

2. The method according to claim 1, further comprising receiving the natural language re-authentication prompt from the second server at the user device, and receiving a response to the natural language re-authentication prompt from the user device at the second server.

3. The method according to claim 2, wherein the response to the natural language re-authentication prompt is transmitted from the user device to the second server without being communicated to the first server.

4. The method according to claim 2, further comprising forwarding the response to the natural language re-authentication prompt from the second server to the organizational server.

5. The method according to claim 4, further comprising determining by the organizational server that the response to the natural language re-authentication prompt satisfies a requirement for the re-authentication of the user.

6. The method according to claim 5, further comprising providing a response to the non-natural language request from the organizational server to the first server upon determining that the response to the natural language re-authentication prompt satisfies the requirement for the re-authentication of the user, wherein the response to the non-natural language request includes at least one of the service and the data.

7. The method according to claim 6, further comprising processing the response to the non-natural language request at the first server, and providing the processed response to the user device from the first server.

8. The method according to claim 1, wherein the conversational component of the second server is configured to operate in the same conversational style as the conversational component of the first server.

9. The method according to claim 1, wherein the first server and the second server each communicate with organizational server independent of each other.

10. The method according to claim 1, wherein the second server comprises a dedicated re-authentication server.

11. The method according to claim 1, wherein the first server is located in a different container from the second server.

12. The method according to claim 1, wherein the natural language re-authentication prompt from the second server to the user device is asynchronous with at least one of the natural language request and the non-natural language request for at least one of the service and the data.

13. A system for re-authentication, comprising:
one or more processing devices operatively connected via a communications network;
an organizational server, implemented by the one or more processing devices, wherein the organizational server is configured to establish an interactive session with a user;
a first server, implemented by the one or more processing devices, wherein the first server is configured to:
receive a natural language request for at least one of a service and data from a user device;
process the natural language request; and
transmit a non-natural language request for at least one of the service and the data to the organizational server, wherein:
the first server includes a conversational component; and
the organizational server is further configured to:
receive the non-natural language request for at least one of the service and the data; and
determine that the non-natural language request requires re-authentication of the user; and
a second server, implemented by the one or more processing devices, wherein the second server is configured to:
receive a non-natural language re-authentication request from the organizational server;
process the non-natural language re-authentication request; and
transmit a natural language re-authentication prompt to the user device;
wherein the non-natural language re-authentication request is transmitted from the organizational server to the second server without being communicated to the first server;
wherein the re-authentication is completed without any awareness of the re-authentication by the first server;
wherein the conversational component of the first server is configured to process the natural language request for at least one of the service and the data into the non-natural language request for at least one of the service and the data to be transmitted to the organizational server;
wherein the second server includes a conversational component independent of the conversational component of the first server;
wherein the conversational component of the second server is configured to process the non-natural language re-authentication request into the natural language re-authentication prompt to be transmitted to the user device;
wherein the second server concurrently communicates with and concurrently processes different re-authentication protocols respectively corresponding to the organizational server and one or more additional organizational servers; and
wherein the organizational server and the one or more additional organizational servers correspond to different respective entities.

14. The system according to claim 13, wherein the second server is further configured to receive a response to the natural language re-authentication prompt from the user device.

15. The system according to claim 14, wherein the response to the natural language re-authentication prompt is transmitted from the user device to the second server without being communicated to the first server.

16. The system according to claim 15, wherein the second server is further configured to forward the response to the natural language re-authentication prompt to the organizational server.

17. The system according to claim 16, wherein the organizational server is further configured to:
determine that the response to the natural language re-authentication prompt satisfies a requirement for the re-authentication of the user; and provide a response to the non-natural language request to the first server upon determining that the response to the natural language re-authentication prompt satisfies the requirement for the re-authentication of the user, wherein the response to the non-natural language request includes at least one of the service and the data.

18. The system according to claim 13, wherein the first server and the second server each communicate with organizational server independent of each other.

19. An article of manufacture comprising a processor-readable storage medium having encoded therein executable code of one or more software programs, wherein the one or more software programs when executed by one or more processing devices implement the steps of:

establishing an interactive session between a user and an organizational server;

receiving a natural language request for at least one of a service and data from a user device via a conversational component of a first server;

processing the natural language request by the first server, and transmitting a non-natural language request for at least one of the service and the data to the organizational server;

receiving the non-natural language request for at least one of the service and the data at the organizational server, and determining by the organizational server that the non-natural language request requires re-authentication of the user;

transmitting a non-natural language re-authentication request from the organizational server to a second server;

processing the non-natural language re-authentication request by the second server and transmitting a natural language re-authentication prompt from the second server to the user device;

wherein the non-natural language re-authentication request from the organizational server to the second server is transmitted to the second server without being communicated to the first server;

wherein the re-authentication is completed without any awareness of the re-authentication by the first server;

wherein the conversational component of the first server is configured to process the natural language request for at least one of the service and the data into the non-natural language request for at least one of the service and the data to be transmitted to the organizational server;

wherein the second server includes a conversational component independent of the conversational component of the first server;

wherein the conversational component of the second server is configured to process the non-natural language re-authentication request into the natural language re-authentication prompt to be transmitted to the user device;

wherein the second server concurrently communicates with and concurrently processes different re-authentication protocols respectively corresponding to the organizational server and one or more additional organizational servers; and wherein the organizational server and the one or more additional organizational servers correspond to different respective entities.

* * * * *